United States Patent
Hammerschmidt (10) Patent No.: US 9,602,894 B2
(45) Date of Patent: Mar. 21, 2017

(54) PROTECTED TRANSMISSION OF INDEPENDENT SENSOR SIGNALS

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 142 days.

(21) Appl. No.: 14/462,844

(22) Filed: Aug. 19, 2014

(65) Prior Publication Data

US 2016/0057510 A1    Feb. 25, 2016

(51) Int. Cl.
*H04Q 9/00* (2006.01)
*G08C 15/00* (2006.01)
*G08C 25/00* (2006.01)

(52) U.S. Cl.
CPC .............. *H04Q 9/00* (2013.01); *G08C 15/00* (2013.01); *G08C 25/00* (2013.01)

(58) Field of Classification Search
CPC ............................................. H04Q 9/00–9/16
USPC ....................... 340/870.01–870.44
See application file for complete search history.

(56) References Cited

U.S. PATENT DOCUMENTS

| | | | | |
|---|---|---|---|---|
| 5,274,554 A * | 12/1993 | Takats | ................ | G06F 11/1641 244/76 R |
| 5,432,497 A * | 7/1995 | Briski | ...................... | G01P 1/07 340/461 |
| 9,381,777 B2 * | 7/2016 | Yu | ...................... | B60C 23/0415 |
| 2005/0275528 A1 * | 12/2005 | Kates | ...................... | G08B 1/08 340/539.22 |
| 2009/0240393 A1 * | 9/2009 | Tu | ...................... | B60T 8/885 701/29.2 |
| 2010/0188254 A1 * | 7/2010 | Johnson | ................ | H04W 36/30 340/870.02 |
| 2012/0093312 A1 * | 4/2012 | Gammel | ................ | H04L 9/0631 380/255 |

(Continued)

FOREIGN PATENT DOCUMENTS

CA    WO 2015027340 A1 *    3/2015    ........ H04W 52/0245

*Primary Examiner* — Joseph Feild
*Assistant Examiner* — Omar Casillashernandez
(74) *Attorney, Agent, or Firm* — Eschweiler & Potashnik, LLC (57) ABSTRACT

The present disclosure relates to a sensor system having a shared communication interface that transmits sensor signals having independent channel protection data from a plurality of sensors. In some embodiments, the sensor signal has a plurality of sensors that independently generate sensor signals corresponding to a sensed quantity. A plurality of channel protection elements respectively receive one of the sensor signals and to introduce channel protection data into the received sensor signal to generate a channel protected sensor (CPS) signal. A shared communication interface receives CPS signals from one or more of the channel protection elements and to selectively provide the CPS signals onto a transmission line according to one or more communication protocols. By introducing channel protection data to the sensor signals upstream of the shared communication interface, a same communication interface can be used to transmit channel protected sensor signals from a plurality of independent sensors.

17 Claims, 4 Drawing Sheets

(56) References Cited

U.S. PATENT DOCUMENTS

2013/0241744 A1* 9/2013 Erdos ................. H04Q 9/00
                                                340/870.02
2014/0281048 A1* 9/2014 Alley .................. G06F 13/385
                                                710/12

* cited by examiner

PROTECTED TRANSMISSION OF INDEPENDENT SENSOR SIGNALS

BACKGROUND

In recent years, computer systems have found increased use as a means to make machinery (e.g., automobiles, industrial machinery, etc.) safer in functional safety applications. Functional safety applications aim to minimize injuries to humans by lowering the probability of undesired events. Often, functional safety applications do so by providing for real-time control of safety-critical applications in automotive and industrial applications. For example, today's automobiles have a wide range of functional safety systems, ranging from airbag deployment systems to advanced driver assistance systems (ADAS) with accident prediction and avoidance capabilities.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Safety-critical systems often comprise sensors configured to measure a physical quantity (i.e., stimuli). The sensors may be configured to provide data corresponding to the measured stimuli to an electronic control unit (ECU). Based upon the received data, the ECU is able to monitor operation of the system and in the case of a dangerous situation to take action by providing a control signal to an actuator. For example, if an automatic breaking system of a first automobile determines that a distance to another automobile is too small, it will generate a control signal that operates an actuator to apply a break of the first automobile.

A safety-critical system has the potential to cause a user physical harm if the system fails to properly perform its intended function. Such a failure of a safety-critical system can be due to a number of causes, such as random hardware faults (e.g., short circuits), communication protocol errors, or transmission line errors, for example. The risk associated with a safety-critical system can be reduced by minimizing the probability of failures. One way to minimize the probability of failures in a safety-critical system is by using multiple independent sensors to detect a physical quantity. The independent sensors can independently transmit sensor signals to an ECU, which can compare the sensor signals to ensure that the sensors are working properly.

In such redundant systems, independent communication interfaces are used to provide data from each of the independent sensors to the ECU. However, it has been appreciated that the use of independent communication interfaces has a number of drawbacks. For example, the independent communication interfaces are expensive and can add a large amount of weight to an automobile, since such a sensor system uses two transmitters, two receivers, and twice the number of transmission lines (e.g., wires). Furthermore, the use of two independently packaged sensors uses more physical space, resulting in a physical distance between measurement points that can cause differences in measurements. The differences in measurements require an increased tolerance for a comparison carried out between sensor signals in order to detect sensor faults.

Accordingly, the present disclosure relates to a sensor system having a shared communication interface that is configured to transmit sensor signals having independent channel protection data from a plurality of sensors. In some embodiments, the sensor system comprises a plurality of sensors configured to independently generate sensor signals corresponding to a sensed quantity. A plurality of channel protection elements are respectively configured to receive one of the sensor signals and to append channel protection data onto the received sensor signal to generate a channel protected sensor (CPS) signal. A shared communication interface is configured to receive CPS signals from one or more of the channel protection elements and to selectively provide the CPS signals onto a transmission line according to one or more communication protocols. By introducing channel protection data to the sensor signals upstream of the shared communication interface, a same communication interface can be used to transmit channel protected sensor signals from a plurality of independent sensors and faults that are introduced by the same communication interface are covered by the same mechanisms as faults that result from distortion outside a sensor integrated chip.

Figure 1:
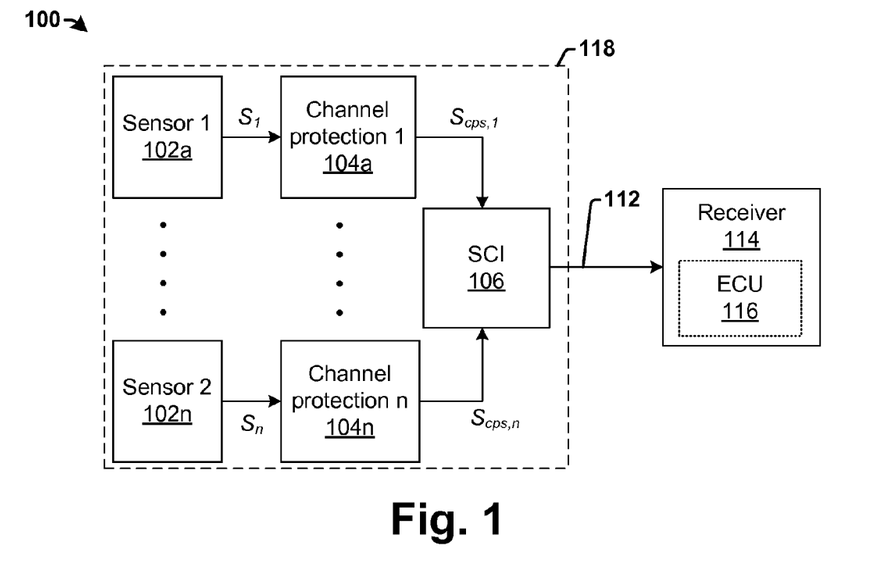
FIG. 1 is block diagram of some embodiments of a sensor system configured to separately introduce channel protection data into independent sensor signals upstream of a shared communication interface.

FIG. 1 is a block diagram of some embodiments of a sensor system 100 configured to provide functional safety by separately introducing channel protection data into independent sensor signals upstream of a shared communication interface 106.

The sensor system 100 comprises a plurality of sensors 102a-102n configured to independently measure a physical quantity. In various embodiments, the plurality of sensors 102a-102n may be configured to measure a physical quantity comprising a steering angle, a temperature, a magnetic field, a spatial location of an object, etc. The plurality of sensors 102a-102n are configured to generate a plurality of independent sensor signals $S_1$-$S_n$, which represent the sensed physical quantity. The plurality of independent sensor signals $S_1$-$S_n$ comprise sensor signals that correspond to a physical stimuli, which are respectively measured by sensors 102a-102n operating independent of one another. For example, a first sensor signal $S_1$ may be measured by a first sensor 102a, while a second sensor signal $S_2$ may be measured by a second sensor 102b. In various embodiments, the plurality of independent sensor signals $S_1$-$S_n$ can be achieved by sensors 102a-102n using different sensor technologies (e.g., a Hall sensor, a GMR senor, etc.), different locations or orientations of the sensor elements, different electrical setups (e.g., sensor biases), different measurement ranges, etc. In some embodiments, the independent sensor signals $S_1$-$S_n$ may be measured by sensors 102a-102n operating using a same measurement principle. In other embodiments, the independent sensor signals $S_1$-$S_n$ may be measured by sensors 102a-102n operating on diverse principles, so that the sensors 102a-102n react differently to common causes.

The plurality of independent sensor signals $S_1$-$S_n$ are provided to a plurality of channel protection elements 104a-104n, respectively. The plurality of channel protection elements 104a-104n are configured to separately add channel protection data (e.g., additional data bits) onto an individual one of the plurality of independent sensor signals $S_1$-$S_n$ to generate a plurality of channel protected sensor (CPS) signals $S_{cps,1}$-$S_{cps,n}$. It is to be understood that the channel protection data may be provided only for selected ones of the sensor signals $S_1$-$S_n$. Alternatively, the channel protection data may be provided for each of the independent sensor signals $S_1$-$S_n$. The channel protection data enables a designated element (e.g., a receiver 114) to detect faults generated during communication protocol generation and/or transmission of the plurality of CPS signals $S_{cps,1}$-$S_{cps,n}$. In some embodiments, the channel protection data may comprise a redundancy code (e.g., any type of error detecting code, such as a cyclic redundancy check), for example. In additional embodiments, the channel protection data may include individual sensor IDs and/or timing information for each independent sensor signal $S_1$-$S_n$.

The plurality of CPS signals $S_{cps,1}$-$S_{cps,n}$ are provided from the plurality of channel protection elements 104a-104n to a shared communication interface 106 connected to the plurality of channel protection elements 104a-104n. In some embodiments, the plurality of sensors 102a-102n, the plurality of channel protection elements 104a-104n, and the shared communication interface 106 are disposed onto a same integrated chip 118 (e.g., a same semiconductor substrate). The shared communication interface 106 is configured to provide the plurality of CPS signals $S_{cps,1}$-$S_{cps,n}$ onto a transmission line 112 according to one or more communication protocols (e.g., PSI5 or SPC). For example, the shared communication interface 106 may send the first CPS signal $S_{cps,1}$ over the transmission line 112 using a first communication protocol (e.g., PSI5) and may further send the second CPS signal $S_{cps,2}$ over the transmission line 112 using a second communication protocol. The second communication protocol may without limitation be the same as the first communication protocol (e.g., PSI5); alternatively the second communication protocol may be different from the first communication protocol (e.g., SPC). A person of ordinary skill in the art will readily understand that there may be more than two communication protocols used in combination with the transmission line 112. In another embodiment, the shared communication interface 106 may collectively transmit CPS signals $S_{cps,1}$-$S_{cps,n}$ from different sensor channels (and hence different sensors 102a-102n) in a large frame that is transmitted using a dedicated communication protocol suitable for such a large frame transmission. The communication protocol may be identical to the first or second protocols or different therefrom, without limitation.

A receiver 114 is configured to receive protocol encoded versions of the plurality of CSP signals $S_{cps,1}$-$S_{cps,n}$ from the transmission line 112 and to decode the protocol encoded versions of the plurality of CSP signals $S_{cps,1}$-$S_{cps,n}$ to recover the plurality of CPS signals $S_{cps,1}$-$S_{cps,n}$ at the receiver 114. In some embodiments, the receiver 114 may comprise an electronic control unit (ECU) 116 configured to control operation of one or more components of a safety functional system (e.g., an actuator). In various embodiments, the ECU 116 may comprise an engine control unit, an airbag control unit, a power steering control unit, or a control unit configured to control an alternative system.

The receiver 114 is configured to use the channel protection data from the recovered CPS signals to determine, if faults have occurred downstream of the plurality of channel protection elements 104a-104n (i.e., if the CSP signals $S_{cps,1}$-$S_{cps,n}$ have been modified in the shared communication interface 106 and/or the transmission line 112). If the receiver 114 determines that a fault is present in a first CPS signal, but not in a second CPS signal, sensor data from the second CPS signal may be reliably used by the receiver 114. If the receiver 114 determines that faults are not present in the plurality of CPS signals, the receiver 114 may also be configured to determine, if the plurality of sensors 102a-102n are properly functioning by comparing individual sensor signals $S_1$-$S_n$. from the plurality of sensors 102a-102n.

Therefore, sensor system 100 comprises a plurality of channel protection elements 104a-104n disposed within separate data paths as distinct elements located upstream of a shared communication interface 106. This allows for the receiver 114 to detect faults introduced into sensor signals by the shared communication interface 106 (i.e., during protocol processing) and the transmission line 112 using a same protection mechanism.

Figure 2:
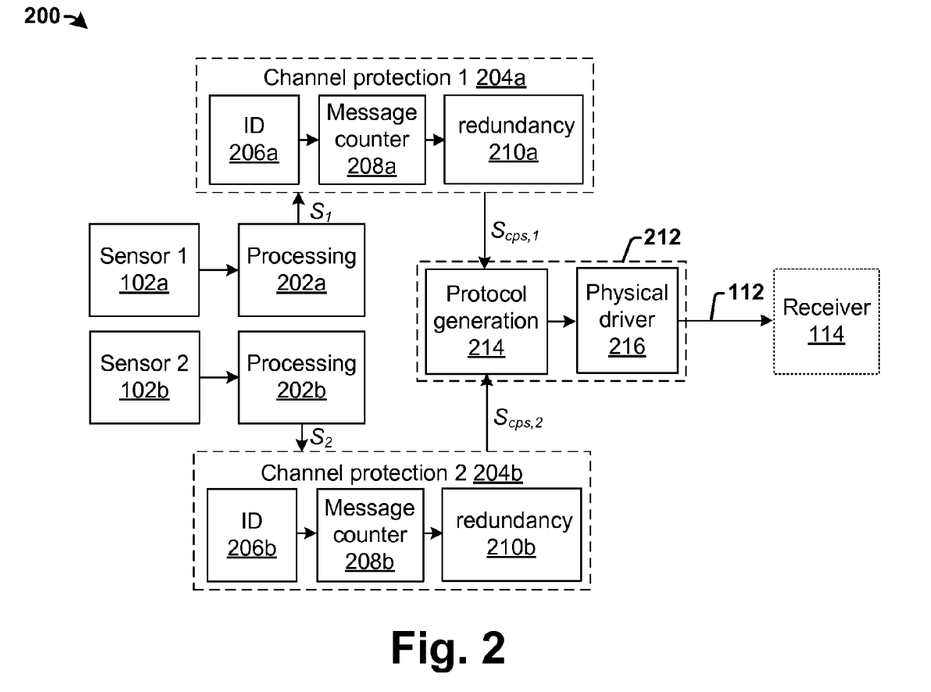
FIG. 2 is a block diagram of some embodiments of a sensor system having a channel protection element comprising a plurality of channel protection mechanisms configured to provide channel protection data to independent sensor signals.

FIG. 2 is a block diagram of some embodiments of a sensor system 200 having channel protection elements 204 configured to append channel protection data onto independent sensor signals.

The sensor system 200 comprises a first sensor 102a and a second sensor 102b. The first and second sensors, 102a and 102b, are configured to provide sensor data corresponding to a sensed physical quantity to processing elements, 202a and 202b, respectively. The processing elements, 202a and 202b, are configured to generate independent sensor signals $S_1$-$S_2$ from the sensor data. In various embodiments, the processing element, 202a and 202b, may generate diverse and/or independent sensor signals $S_1$-$S_2$ by using different data rates, different sampling phases, different measurement ranges, different encoding, and/or different types of signal processing.

The independent sensor signals $S_1$-$S_2$ are provided to channel protection elements, 204a and 204b, respectively. The channel protection elements, 204a and 204b, respectively may comprise a plurality of channel protection mechanisms 206-210 configured to add channel protection data to the sensor signals $S_1$-$S_2$ to generate a plurality of CPS signals $S_{cps,1}$-$S_{cps,2}$. As shown in FIG. 2, channel protection mechanisms 206-210 associated with the first independent sensor signal $S_1$ of first channel protection element 204a are indicated as 206a-210a, while channel protection mechanisms associated with the second independent sensor signal $S_2$ of second channel protection element 204b are indicated as 206b-206b.

In some embodiments, the channel protection data may comprise one or more bits appended to the sensor signals $S_1$-$S_2$. The channel protection data, added to each of the independent sensor signals $S_1$-$S_2$ by one or more of the plurality of channel protection mechanisms 206-210, allows for the detection of faults introduced within downstream elements such as a protocol generation element 214, a physical driver 216, and/or a transmission line 112 (over a single message or over a sequence of messages). In some embodiments, the resources used by the sensor system 200 can be reduced by omitting one or more of the plurality of channel protection mechanisms 206-210 or by using at least one of the plurality of channel protection mechanisms 206-210 commonly for both channel protection elements, 204a and 204b.

In various embodiments, the plurality of channel protection mechanisms 206-210 may comprise one or more of an ID appending block 206, a message counter block 208, and/or a redundancy block 210. The ID appending block 206x (where x=1 or 2) is configured to append an identification code (an ID code) to a sensor signal $S_x$ (e.g., ID appending block 206a may append a first ID to a first sensor signal $S_1$ and ID appending block 206b may append a different second ID to a second sensor signal $S_2$). The message counter block 208x is configured to append timing information and/or a message count to a sensor signal S, (e.g., message counter block 208a may append timing information to a first sensor signal $S_1$ and message counter block 208b may append different timing information to a second signal $S_2$). The redundancy block 210x is configured to append a redundancy code to a sensor signal $S_x$. In various embodiments, the redundancy code may comprise a cyclic redundancy check (CRC) or a checksum. Typically, the redundancy code may allow detection of 1, 2, or 3 bit failures, however depending on a complexity of redundancy code larger bit failures can be detected.

In some embodiments, the plurality of channel protection mechanisms 206-210 may comprise a combination of a message counter block 208x and a redundancy block 210x, wherein the message counter block 208x is configured to modify a seed value used by the redundancy block 210x to generate a redundancy code. By modifying the seed value used by the redundancy block 210x, the message counter block 208 modifies a starting point (i.e., a starting value) from which the redundancy block 210x generates the redundancy code. For example, for a redundancy code comprising a cyclic redundancy check (CRC), the seed value is an initial CRC value from which a CRC calculation proceeds to generate a CRC used as a redundancy code. In some embodiments, the plurality of channel protection mechanisms 206-210 may comprise a combination of an ID appending block 206x and a redundancy block 210x, wherein the ID appending block 206x is configured to generate an ID using a different redundancy generation algorithm from that used by the redundancy block 210x.

The plurality of CPS signals $S_{cps,1}$-$S_{cps,2}$ are provided from the channel protection elements, 204a and 204b, to a shared communication interface 212 connected to the plurality of channel protection elements, 204a and 204b. In some embodiments, the shared communication interface 212 may comprise a protocol generation element 214 and a physical driver 216.

The protocol generation element 214 is configured to define a communication protocol by which the plurality of CPS signals $S_{cps,1}$-$S_{cps,2}$ are to be transmitted on transmission line 112. For example, the protocol generation element 214 may add timing information corresponding to a communication protocol to the CPS signals $S_{cps,1}$-$S_{cps,2}$. The protocol generation element 214 also controls operation of the physical driver 216, which will physically generate signals for a selected protocol (e.g., provide modulation of an output current or voltage signal). In some embodiments, the shared communication interface 212 may transmit the CPS signals $S_{cps,1}$-$S_{cps,2}$ using one or more digital sensor protocols (e.g., a two-wire protocol such as PSI5 (Peripheral Sensor Interface) or DSI (Digital Sensor Interface), a three-wire protocol, etc.).

A receiver 114 is configured to receive and decode the protocol encoded CPS signals $S_{cps,1}$-$S_{cps,2}$. Based upon the channel protection data of the decoded CPS signals $S_{cps,1}$-$S_{cps,2}$, the receiver 114 may determine if a fault has been introduced into the CPS signals $S_{cps,1}$-$S_{cps,2}$. For example, if the identification code of a decoded CPS signal $S_{cps,1}$-$S_{cps,2}$ received at the receiver 114 does not match an expected identification code, or if the timing information of a decoded CPS signal $S_{cps,1}$-$S_{cps,2}$ received at the receiver 114 does not match an expected timing information derived from the receiver time base, or if a sequence of the timing information of a decoded CPS signal $S_{cps,1}$-$S_{cps,2}$ received at the receiver 114 from one of the sensor channels is getting irregular, the receiver 114 can determine that a fault has been introduced into the CPS signals. Similarly, the receiver 114 can determine if a fault has occurred based upon the redundancy code of a decoded CPS signal.

Figure 3:
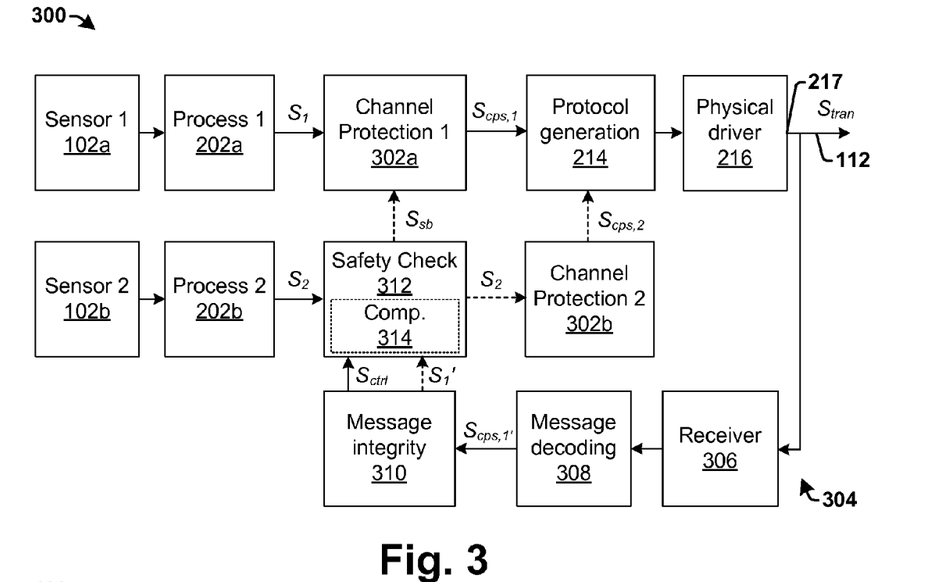
FIGS. 3-5 are block diagrams of some additional embodiments of a sensor system configured to provide functional safety using independent sensor signals.

FIG. 3 is a block diagram of some additional embodiments of a sensor system 300 configured to provide functional safety using independent sensor signals.

The sensor system 300 comprises a first sensor 102a and a second sensor 102b. The first and second sensors, 102a and 102b, are respectively coupled to first and second processing elements, 202a and 202b, which are configured to provide some processing of signals sensed at the respective sensor element 102a, 102b in order to arrive at a first sensor signal $S_1$ and/or a second sensor signal $S_2$. A first channel protection element 302a is configured to receive the first sensor signal $S_1$ from a first sensor 102a and to append channel protection data thereto to generate a first CPS signal $S_{cps,1}$. The first CPS signal $S_{cps,1}$ is provided to a protocol generation element 214. The protocol generation element 214 is configured to define a communication protocol by which the first CPS signal $S_{cps,1}$ is to be transmitted and to control operation of the physical driver 216, which will physically generate a transmitted signal $S_{tran}$ on transmission line 112 according to the defined communication protocol.

The transmitted signal $S_{tran}$ is provided to an output 217 of the physical driver 216. In some embodiments, the output 217 is connected to a feedback path 304 comprising a receiver 306 configured to receive the transmitted signal $S_{tran}$ and to provide the received transmitted signal to a message decoding element 308. In other embodiments, the output 217 is provided to the transmission line 112, to which a receiver (not shown) is coupled. In such embodiments, the receiver is further connected to the message decoding element 308 by way of a feedback path (not shown). The message decoding element 308 is configured recover the first CPS signal $S_{cps,1}$' by decoding the selected communication protocol of the transmitted signal $S_{tran}$ using an inverse operation of the protocol generation element 214 (e.g., by extracting "1" and "0" from a received current or voltage).

The recovered first CPS signal $S_{cps,1}$' is provided to a message integrity block 310, which is configured to detect faults in the transmitted signal $S_{tran}$ by operating upon channel protection data of the recovered first CPS signal $S_{cps,1}$'. The message integrity block 310 is configured to send a control signal $S_{ctrl}$ to a safety check element 312, which has a value that depends upon the channel protection data. For example, the control signal $S_{ctrl}$ will have a first value (e.g., a "1") if the channel protection data indicates that the recovered first CPS signal $S_{cps,1}$' has been modified by faults, and a second value (e.g., a "0") if the channel protection data indicates that the recovered first CPS signal $S_{cps,1}$'has not been modified by faults.

If the message integrity block 310 determines that the recovered first CPS signal $S_{cps,1}$' has been modified by faults, the control signal $S_{ctrl}$ will cause an action to be taken in response to the fault. In some embodiments, the protocol generation element 214 may choose a different communication protocol if a fault is detected. In other embodiments, the safety check element 312 may provide the second sensor signal $S_2$ to the second channel protection element 302b if a fault is detected. The second channel protection element 302b will append channel protection data to the second sensor signal $S_2$ to generate a second CPS signal $S_{cps,2}$, which the protocol generation element 214 will multiplex onto the transmission line 112 along with the first CPS signal $S_{cps,1}$, so as to provide available sensor data from the first and second sensors, 102a and 102b, to a receiver (e.g., an ECU).

In a further embodiment, the safety check block 312 may set an error flag as a part of a next signal/message to inform the receiver (e.g., ECU) that the last signal/message was not successfully verified to be free of faults.

If the message integrity block 310 determines that the recovered first CPS signal $S_{cps,1}'$ has not been modified by faults, the control signal $S_{ctrl}$ may operate the safety check element 312 to perform a check to determine if at least one of the sensors, 102a and 102b, is not operating properly (e.g., by comparison or correlation of a recovered first sensor signals $S_1'$ and sensor signal $S_2$). The result of the check may then transmitted as a part (e.g. a status information) of the first CPS signals $S_{cps,1}$ or as an independent signal/message. By operating the safety check element 312 to determine if at least one of the sensors, 102a and 102b, is not operating properly, the sensor system 300 can reduce the amount of information transmitted to a receiver by transmitting a result of a comparison rather than the sensor data (e.g., the first and second CPS signals) of both sensors, 102a and 102b.

In some embodiments, the safety check element 312 is configured to perform a message integrity check, and based upon the message integrity check to generate status information $S_{sb}$ (e.g., a status bit) that indicates to a receiver whether or not at least one of the first and second sensors, 102a and 102b, is not operating properly (e.g., whether or not the second sensor signal $S_2$ is equivalent to a decoded version of a first sensor signal $S_1'$). For example, the safety check element 312 may comprise a comparison element 314 configured to compare the recovered first signal $S_1'$ to a second sensor signal $S_2$ output from or associated to the second sensor 102b. If the recovered first sensor signal $S_1'$ and the second sensor signal $S_2$ are substantially equivalent, the comparison element 314 determines that the sensors, 102a and 102b, are operating properly and a status bit $S_{sb}$ having a first value is provided to the first channel protection element 302a. A person of ordinary skill in the art may readily appreciate measures to identify whether or not the first Signal $S_1$ and the second sensor signal $S_2$ are substantially equivalent, for example threshold values, tolerance bands, and the like.

If the recovered first sensor signal $S_1'$ and the second sensor signal $S_2$ are not substantially equivalent, the comparison element 314 may determine that at least one of the sensors, 102a and 102b, is not operating properly and a status bit $S_{sb}$ having a second value is provided to the first channel protection element 302a. The first channel protection element 302a is configured to append the status bit $S_{sb}$ to the first CPS signal $S_{cps,1}$ or to generate an independent error message that allows a receiver to determine whether the message integrity check (e.g., the comparison) failed.

In some embodiments, the comparison element 314 may attribute a substantially identical reliability to the recovered first sensor signal $S_1'$ and the second sensor signal $S_2$. If for such a reliability attribution the first sensor signal $S_1'$ and the second sensor signal $S_2$ are not substantially equivalent, the comparison element 314 may conclude that at least one of the first sensor 102a and the second sensor 102b is no longer working properly, as there are no reliable means to distinguish whether only the first sensor 102a or only the second sensor 102b is no longer working reliably.

In some other embodiments, however the comparison element 314 may have reason to attribute substantially different reliability to the recovered first sensor signal $S_1'$ and the second sensor signal $S_2$. Such different reliability attributions could be due the first channel protection element 302a providing a higher level of channel protection than the second channel protection element 302b or vice versa. For such a reliability attribution, the comparison element 314 may give the recovered first sensor signal $S_1'$ priority over the second sensor signal $S_2$. The different reliability attribution may be used to override the sensor (recovered) signal with lower reliability attribution by the respective (recovered) sensor signal with higher reliability attribution as an extreme case. Milder forms of weighing the recovered first sensor signal $S_1'$ and the second sensor signal $S_2$ leading to some sort of weighted average value are conceivable too, without any limitation.

In some embodiments, if the comparison element 314 determines that at least one of the sensors, 102a and 102b, is not operating properly, the safety check element 312 will provide a status bit $S_{sb}$ having the second value to the first channel protection element 302a and the second sensor signal $S_2$ to the second channel protection element 302b. The second channel protection element 302b may append channel protection data to the second sensor signal $S_2$ to generate a second CPS signal $S_{cps,2}$, which the protocol generation element 214 will multiplex onto the transmission line 112 along with the first CPS signal $S_{cps,1}$, so as to provide available sensor data from the first and second sensor, 102a and 102b, to a receiver (e.g., an ECU) configured to make a decision on the functional safety of a system.

Figure 4:
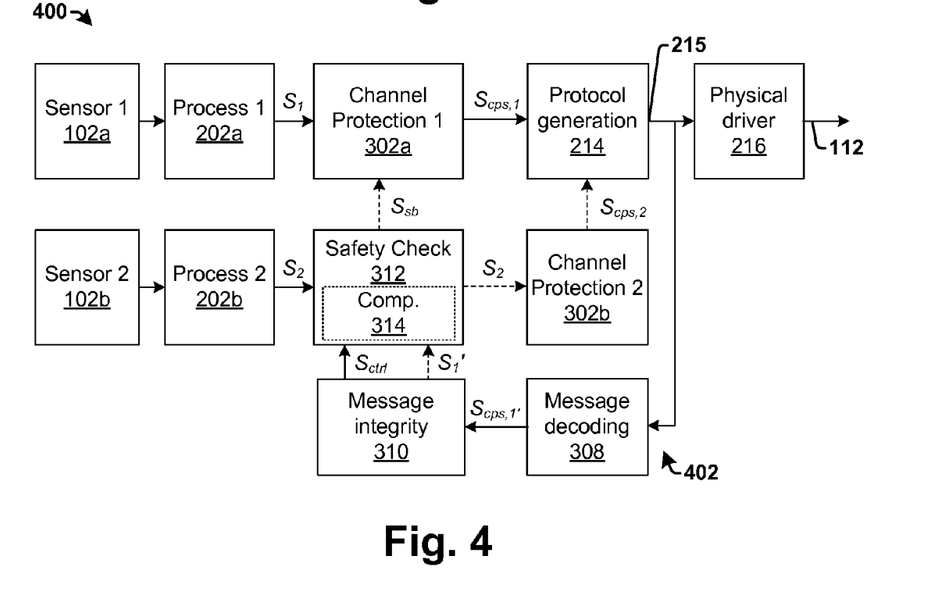

FIG. 4 is a block diagram of some additional embodiments of a sensor system 400 configured to provide functional safety using independent sensor signals.

The sensor system 400 comprises a truncated feedback path 402 that extends from an output 215 of the protocol generation element 214 to a message decoding element 308, which is configured to operate as described above. By extending the truncated feedback path 402 from the output 215 of the protocol generation element 214 to the message decoding element 308, the feedback path is able to provide the transmitted data to the message decoding element 308 without using a physical receiver (e.g., receiver 306, as discussed in combination with FIG. 3). However, extending the truncated feedback path 402 from the output 215 of the protocol generation element 214 may exclude the physical driver 216 from the functional safety check provided by the first and second channel protection elements, 204a and 204b.

Figure 5:
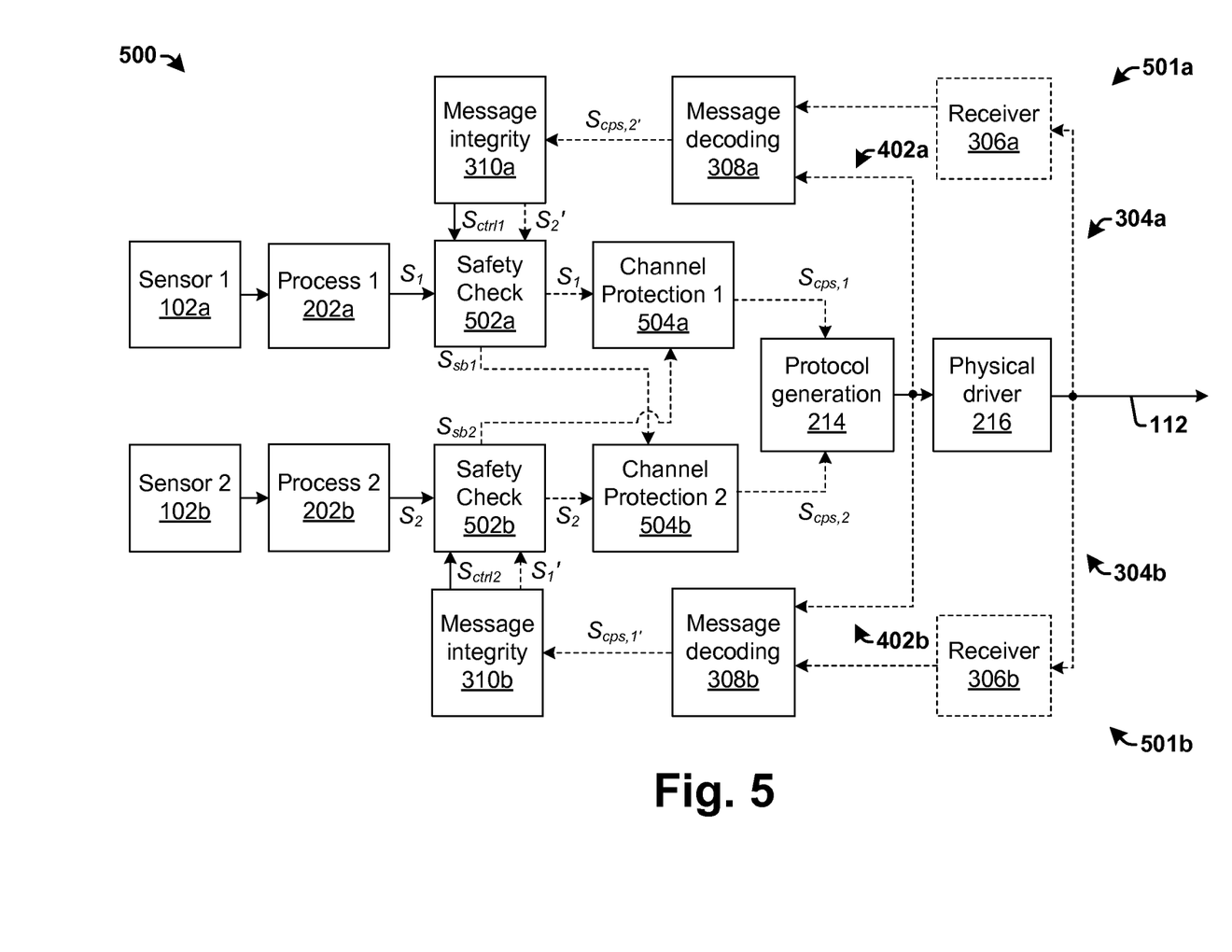

FIG. 5 is a block diagram of some additional embodiments of a sensor system 500 configured to provide functional safety using independent sensor signals.

The sensor system 500 comprises a first feedback system 501a and a redundant second feedback system 501b. The first feedback system 501a is configured to provide a protocol coded version of the second CPS signal $S_{cps,2}$ to a first message decoding element 308a. The second feedback system 501b is configured to provide a protocol coded version of the first CPS signal $S_{cps,1}$ to a second message decoding element 308b. In various embodiments, the first feedback system 501a and/or the second feedback system 501b may comprise a feedback path 304a, 304b configured to provide a transmitted signal from an output of the physical driver 216 to the message decoding element 308 (via a receiver 306) or a feedback path 402a, 402b configured to provide a transmitted signal from an output of the protocol generation element 214 to the respective message decoding elements 308a, 308b.

The first message decoding element 308a and the second message decoding element 308b are configured to respectively provide recovered CPS signals $S_{cps,1}'$, $S_{cps,2}'$ to message integrity blocks 310a, 310b which are configured to provide control signals, $S_{ctrl1}$ and $S_{ctrl2}$, to the first and second safety check elements, 502a and 502b, respectively. The first and second safety check elements, 502a and 502b, are configured to operate as described above with respect to sensor system 500. The redundant first and second feedback systems, 501a and 501b, provide fault coverage of the safety check blocks, 502a and 502b. For example, if the safety check block 502a is malfunctioning, it may provide for a false status bit (e.g., a first status bit $S_{sb1}$ indicating that at least one of sensors, 102a and 102b, are operating properly). By having a redundant safety check block 502b, such a malfunction can be detected by a receiver located within a feedback loop, 304a or 304b, or a receiver coupled to the transmission line 112 (e.g., if the receiver also receives a second status bit $S_{sb2}$ indicating that at least one of sensors, 102a and/or 102b, are not operating properly). In some embodiments, the redundant safety check blocks, 502a and 502b, may apply weighting to the recovered signals and/or the sensor signals.

Figure 6:
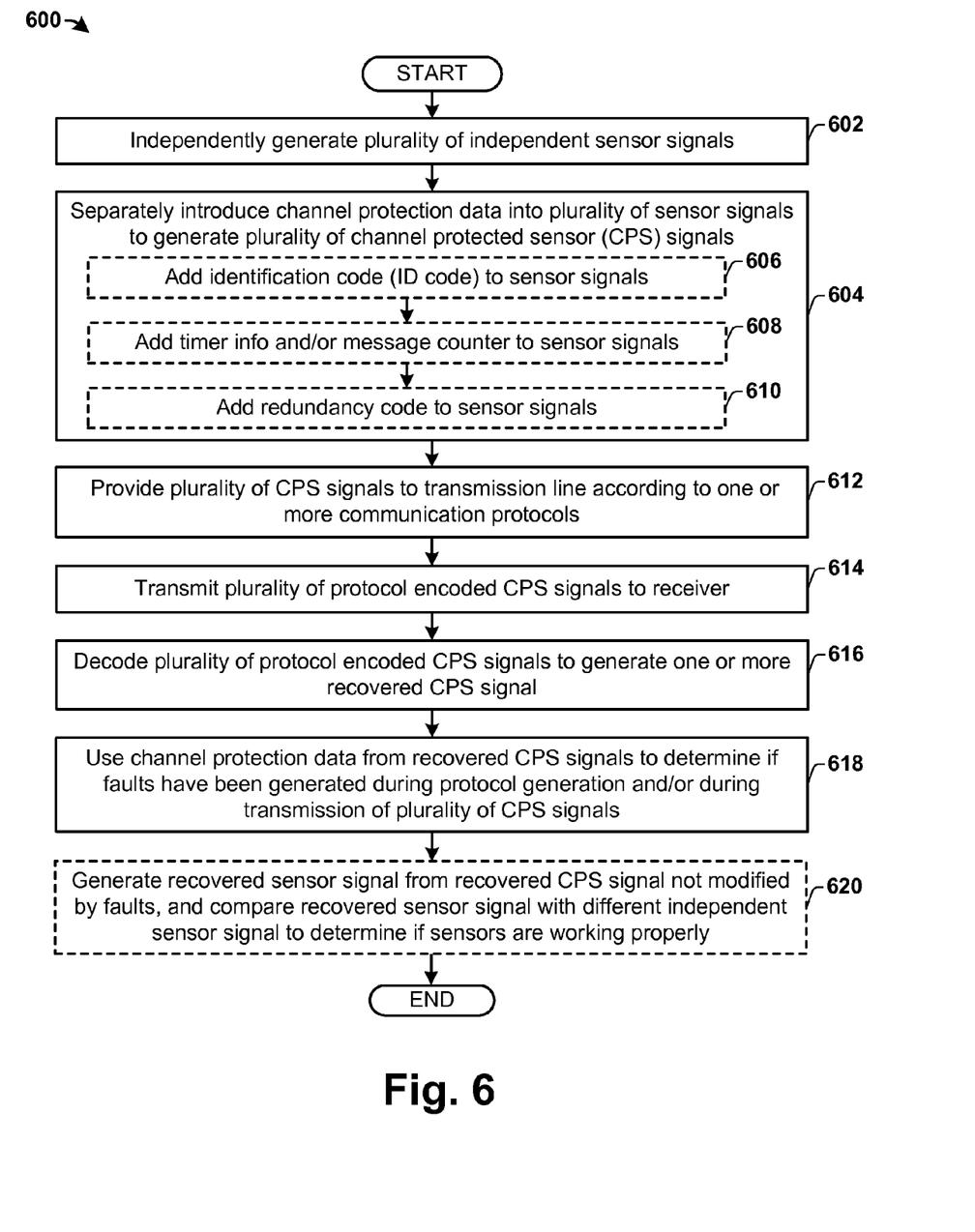
FIG. 6 is a flow diagram of some embodiments of a method of providing functional safety by introducing channel protection data to independent sensor signals.

FIG. 6 is a flow diagram of some embodiments of a method 600 of providing functional safety by implementing protection data to independent sensor signals.

It will be appreciated that while method 600 is illustrated and described below as a series of acts or events, the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 602, a plurality of independent sensor signals corresponding to a physical quantity are independently generated. The plurality of independent sensor signals may correspond to a physical stimuli measured by by a plurality of sensors (e.g., a first sensor may be configured to generate a first sensor signal, a second sensor may be configured to generate a second sensor signal, etc.). In various embodiments, the plurality of independent sensor signals can be generated by sensors using different sensor technologies (e.g., a Hall sensor, a GMR senor, etc.), different locations or orientations of the sensor elements, different electrical setups (e.g., sensor biases), different measurement ranges, etc. In some embodiments, the independent sensor signals may be measured by sensors operating using a same measurement principle. In other embodiments, the independent sensor signals may be measured by sensors operating on diverse principles, so that the sensors react differently to common causes.

At 604, channel protection data is separately added into the plurality of independent sensor signals to generate a plurality of channel protected sensor (CPS) signals. The channel protection data comprises data that enables a designated element (e.g., a downstream receiver or a message integrity element within a feedback path) to detect faults introduced into the sensor signals during protocol generation (act 612) and/or transmission of the plurality of independent sensor signals (614).

In various embodiments, channel protection data may be added to the plurality of sensor signals according to one or more of acts 606-610. At 606, an identification code (ID code), indicative of a sensor that generated the sensor signal, may be independently added to the plurality of sensor signals. At 608, timing information and/or a message count may be independently added to the plurality of sensor signals. At 610, redundancy code (e.g., a CRC) may be independently added to the plurality of sensor signals.

At 612, the plurality of CPS signals are provided to a transmission line according to one or more communication protocols. In various embodiments, the one or more communication protocols may comprise one or more of a PSI5 or DSI3 communication protocol. In some embodiments, the plurality of CPS signals are provided to a shared communication interface. The shared communication interface is then operated to provide the plurality of CPS signals to a transmission line according to one or more communication protocols.

At 614, the protocol encoded CPS signals are transmitted from the shared communication interface to a receiver by way of a transmission line.

At 616, one or more of the plurality of protocol encoded CPS signals is recovered. The one or more of the plurality of protocol encoded CPS signals may be recovered by decoding one or more of the protocol encoded CPS signals.

At 618, the channel protection data from the one or more recovered CPS signals is used to determine if faults have been generated during protocol generation (act 612) and/or transmission (act 614).

In some embodiments, the channel protection data from the plurality of CPS signals may be used by the receiver to determine if faults have been generated during protocol generation and/or transmission.

In other embodiment, the channel protection data for a first one of the plurality of CPS signals may be provided by a feedback loop to a safety check element. If the channel protection data indicates that faults are not present in the first one of the plurality of CPS signals, less than the plurality of communication protocols may be transmitted to the receiver. For example, the communication protocol for the first sensor signal may be transmitted from the shared communication interface to a receiver without transmitting the communication protocol of the second sensor signal. If the channel protection data indicates that faults are present in the first one of the plurality of CPS signals, additional communication protocols may be transmitted to the receiver.

At 620, a recovered sensor signal may be generated, from a recovered CPS signal that has not been modified by faults, and compared to a different independent sensor signal to determine if the sensors are operating properly, in some embodiments.

In some embodiments, weighting may used to determine if a the plurality of sensors operating properly. For example, in some embodiments, a substantially identical reliability may be attributed to a recovered first sensor signal and a second sensor signal. If for such a reliability attribution the first sensor signal and the second sensor signal are not substantially equivalent, at least one of the first sensor and the second sensor is no longer working properly. In other embodiments, substantially different reliability may be attributed to the recovered first sensor signal and the second sensor signal (e.g., a first channel may have a higher level of channel protection than a second channel). For such a reliability attribution, the different reliability attribution may be used to override the sensor (recovered) signal with lower reliability attribution by the respective (recovered) sensor signal with higher reliability attribution as an extreme case.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions

What is claimed is:

1. A sensor system, comprising:
a plurality of sensors configured to independently provide sensor data corresponding to a sensed quantity to a processing element;
a plurality of processing elements, respectively configured to receive the sensor data output from the plurality of sensors and to generate sensor signals from the sensor data;
a plurality of channel protection elements, respectively configured to receive one of the sensor signals output from the plurality of processing elements and to introduce channel protection data into the received sensor signal to generate a channel protected sensor (CPS) signal, wherein the CPS signal is a digital signal;
a shared communication interface configured to receive CPS signals from the plurality of channel protection elements and to provide the CPS signals onto a transmission line coupled to an engine control unit according to one or more communication protocols, wherein the shared communication interface receives the CPS signals prior to the CPS signals being multiplexed by the shared communication interface onto the transmission line;
a feedback path configured to provide the transmitted signal to a message decoding element configured to generate a recovered first CPS signal by decoding a protocol encoded first CPS signal comprised within the transmitted signal;
a message integrity block configured to detect faults in the recovered first CPS signal by operating upon the channel protection data of the recovered first CPS signal;
a safety check element configured to compare or correlate a second sensor signal from a second sensor to the recovered first sensor signal generated from the recovered first CPS signal;
wherein the safety check element is configure to provide a status bit to a first channel protection element and to provide a second sensor signal to a second channel protection element if the safety check element indicates that a fault is present in the recovered first CPS signal;
wherein the second channel protection element is configured to provide a second CPS signal to the protocol generation element if the safety check element indicates that the fault is present in the recovered first CPS signal; and
wherein the second channel protection element is configured to not provide the second CPS signal to the protocol generation element if the safety check element indicates that a fault is not present in the recovered first CPS signal.

2. The sensor system of claim 1, wherein the plurality of channel protection elements, respectively comprise a plurality of:
an ID appending block configured to append an identification code to the received sensor signal, wherein the identification code identifies a sensor that generated the received sensor signal;
a message counter block configured to append timing information or a message count to the received sensor signal;
a redundancy block configured to append a redundancy code to the received sensor signal;
a combination of the message counter block and the redundancy block, wherein the message counter block is configured to modify a seed value used by the redundancy block to generate the redundancy code; and
a combination of the ID appending block and the redundancy block, wherein the ID appending block is configured to generate the identification code using a different redundancy generation algorithm than that used by the redundancy block.

3. The sensor system of claim 1, wherein the shared communication interface comprises:
a protocol generation element configured to receive the CPS signals from the plurality of channel protection elements and to define the one or more communication protocols; and
a physical driver configured to physically generate a transmitted signal on the transmission line having one or more protocol encoded CPS signals encoded according to the one or more communication protocols.

4. The sensor system of claim 1, wherein the feedback path extends from an output of the protocol generation element to an input of the message decoding element.

5. The sensor system of claim 1, further comprising: a receiver configured to receive the transmitted signal from an output of the physical driver and to provide the transmitted signal to the message decoding element.

6. The sensor system of claim 1, wherein the protocol generation element is configured to change a communication protocol of a first CPS signal if the message integrity block detects a fault in the recovered first CPS signal.

7. The sensor system of claim 1, wherein the safety check element is configured to provide a status information to a first channel protection element configured to append the status information to a first CPS signal; and wherein the status information is indicative of whether the plurality of sensors are operating properly.

8. A sensor system, comprising:
a first sensor configured to generate a first sensor signal corresponding to a sensed quantity;
a second sensor configured to generate a second sensor signal corresponding to the sensed quantity;
a first channel protection element coupled to an output of the first sensor and configured to introduce first channel protection data into the first sensor signal to generate a first channel protected sensor (CPS) signal, wherein the first channel protection data is a status bit indicative of whether the first sensor is operating properly;

a second channel protection element coupled to an output of the second sensor and configured to introduce second channel protection data into the second sensor signal to generate a second CPS signal, wherein the second channel protection data is a status bit indicative of whether the second sensor is operating properly;

a protocol generation element connected to the first channel protection element and the second channel protection element and configured to receive the first CPS signal and the second CPS signal and define one or more communication protocols;

a physical driver configured to physically generate a transmitted signal on a transmission line having one or more protocol encoded first and second CPS signals encoded according to the one or more communication protocols; and a receiver connected to the physical driver and configured to receive the transmitted signal.

9. The sensor system of claim 8, wherein the first channel protection element and the second channel protection element, respectively comprise a plurality of:

an ID appending block configured to append an identification code to the received sensor signal, wherein the identification code identifies a sensor that generated the received sensor signal;

a message counter block configured to append timing information or a message count to the received sensor signal;

a redundancy block configured to append a redundancy code to the received sensor signal;

a combination of the message counter block and the redundancy block, wherein the message counter block is configured to modify a seed value used by the redundancy block to generate the redundancy code; and a combination of the ID appending block and the redundancy block, wherein the ID appending block is configured to generate the identification code using a different redundancy generation algorithm than that used by the redundancy block.

10. The sensor system of claim 8, further comprising:

a feedback path configured to provide the transmitted signal to a message decoding element configured to generate a recovered first CPS signal by decoding a protocol encoded first CPS signal comprised within the transmitted signal;

a message integrity block configured to detect faults in the recovered first CPS signal by operating upon the channel protection data of the recovered first CPS signal; and a safety check element configured to compare or correlate the second sensor signal to a recovered first sensor signal generated from the recovered first CPS signal.

11. The sensor system of claim 10, wherein the feedback path extends from an output of the protocol generation element to an input of the message decoding element.

12. The sensor system of claim 10, further comprising:

a receiver configured to receive the transmitted signal from the feedback path, which extends from an output of the physical driver to an input of the receiver.

13. The sensor system of claim 10, wherein the second channel protection element is configured to provide the second CPS signal to the protocol generation element if the safety check element indicates that a fault is present in the first CPS signal; and wherein the second channel protection element is configured to not provide the second CPS signal to the protocol generation element if the safety check element indicates that a fault is not present in the first CPS signal.

14. The sensor system of claim 10, wherein the safety check element is configured to provide a status information to the first channel protection element, which is configured to append the status bit to the first CPS signal; and wherein the status information is indicative of whether at least one of the first sensor and the second sensor are not operating properly.

15. A method, comprising:

independently generating a plurality of independent sensor signals;

separately introducing channel protection data into one or more of the plurality of sensor signals to generate one or more channel protected sensor (CPS) signals, wherein the one or more CPS signals are digital signals;

prior to the CPS signals being multiplexed by a shared communication interface onto a transmission line, providing the one or more CPS signals to the shared communication interface configured to receive the one or more CPS signals;

after the shared communication interface receives the CPS signals, providing the one or more CPS signals to the transmission line according to one or more communication protocols;

transmitting the one or more CPS signals to a receiver;

using the channel protection data from the one or more CPS signals to determine if faults have been generated during protocol generation or during transmission of the one or more CPS signals;

generating a status bit indicative of whether the plurality of sensors are operating properly;

appending the status bit to a first CPS signal; and transmitting the first CPS signal and the status bit to the receiver.

16. The method of claim 15, wherein introducing channel protection data into the plurality of sensor signals, comprises one or more of:

appending an identification code to a received sensor signal, wherein the identification code identifies a sensor that generated the received sensor signal;

appending timing information or a message count to the received sensor signal; and appending a redundancy code to the received sensor signal;

appending the timing information and the redundancy code to the received sensor signal, wherein the timing information is used to modify a seed value used to generate the redundancy code; and appending an identification code and the redundancy code to the received sensor signal, wherein the identification code is generated using a different redundancy generation algorithm than that used to generate the redundancy code.

17. The sensor system of claim 10, wherein the protocol generation element is configured to change a communication protocol of a first CPS signal if the message integrity block detects a fault in the recovered first CPS signal.

* * * * *